United States Patent
Carbune et al.

(10) Patent No.: US 12,094,454 B2
(45) Date of Patent: Sep. 17, 2024

(54) MULTIMODAL INTENT UNDERSTANDING FOR AUTOMATED ASSISTANT

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Moutain View, CA (US)

( * ) Notice: Subject to any disclaimer, the term of this patent is extended or adjusted under 35 U.S.C. 154(b) by 340 days.

(21) Appl. No.: 17/568,920

(22) Filed: Jan. 5, 2022

(65) Prior Publication Data

US 2023/0215422 A1    Jul. 6, 2023

(51) Int. Cl.
| | |
|---|---|
| *G10L 15/08* | (2006.01) |
| *G06N 20/00* | (2019.01) |
| *G10L 15/22* | (2006.01) |
| *G10L 21/0216* | (2013.01) |

(52) U.S. Cl.
CPC ............ *G10L 15/08* (2013.01); *G06N 20/00* (2019.01); *G10L 15/22* (2013.01); *G10L 2021/02163* (2013.01)

(58) Field of Classification Search
CPC ................. G10L 15/08; G10L 15/22; G10L 2021/02163; G06N 20/00
See application file for complete search history.

(56) References Cited

U.S. PATENT DOCUMENTS

| | | | |
|---|---|---|---|
| 2009/0106025 A1* | 4/2009 | Toyama | G10L 17/00 |
| | | | 704/250 |
| 2020/0105264 A1* | 4/2020 | Jang | G10L 15/22 |
| 2021/0082421 A1* | 3/2021 | Kim | G10L 15/22 |

* cited by examiner

*Primary Examiner* — Richemond Dorvil
*Assistant Examiner* — Ethan Daniel Kim
(74) *Attorney, Agent, or Firm* — Gray Ice Higdon

(57) ABSTRACT

Implementations described herein include detecting a stream of audio data that captures a spoken utterance of the user and that captures ambient noise occurring within a threshold time period of the spoken utterance being spoken by the user. Implementations further include processing a portion of the audio data that includes the ambient noise to determine ambient noise classification(s), processing a portion of the audio data that includes the spoken utterance to generate a transcription, processing both the transcription and the ambient noise classification(s) with a machine learning model to generate a user intent and parameter(s) for the user intent, and performing one or more automated assistant actions based on the user intent and using the parameter(s).

19 Claims, 5 Drawing Sheets

MULTIMODAL INTENT UNDERSTANDING FOR AUTOMATED ASSISTANT

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an explicit input (e.g., commands, queries, and/or requests) to the automated assistant that can cause the automated assistant to generate and provide responsive output, to control one or more Internet of things (IoT) devices, and/or to perform one or more other functionalities (e.g., assistant actions). This explicit input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices (i.e., a client device with an automated assistant client) and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), audio data of a spoken utterance of a user (or a locally generated text conversion thereof, or a locally generated semantic representation of the locally generated text), and optionally data indicative of an account associated with the user (e.g., credentials). The cloud-based counterpart can perform various processing on the data, provided by the automated assistant client, to return result(s) to the automated assistant client (which may then provide corresponding output to the user), to control smart device(s), and/or to perform other action(s) reflected by the spoken utterance of the user. In other cases, automated assistants may be at least selectively exclusively executed locally by assistant devices to reduce latency.

Many spoken utterances that are processed by an automated assistant are ambiguous. For many ambiguous spoken utterances, the automated assistant can fail to initially resolve intent(s) of those spoken utterance(s) and/or parameter(s) for those intent(s). This can result in the automated assistant needing to engage in further dialog (e.g., audible and/or visual prompt(s)) with a user in resolving the intent(s) and/or parameter(s). Such further dialog prolongs the user-assistant interaction in performing the action(s) that correspond to the intent(s) and/or parameter(s), resulting in increased utilization of assistant device resources, cloud-based resource(s), and/or network resource(s) (e.g., those utilized in assistant device/cloud-based communication(s)). For other ambiguous spoken utterances, the automated assistant can resolve incorrect intent(s) and/or incorrect parameter(s) (optionally without engaging in further dialog), resulting in performing incorrect action(s) that correspond to the incorrect intent(s) and/or parameter(s). Such performance of incorrect action(s) results in wasteful performance of the incorrect action(s) and, further, can result in the user providing yet another spoken utterance in an attempt to have the correct action(s) performed by the automated assistant.

SUMMARY

Implementations described herein relate to determining, based on processing of ambient noise, one or more user intents and/or one or more parameters (for the intent(s)) for a user request. The ambient noise is detected via one or more microphones that are in the environment of the user and/or the environment of the assistant device via which the user request is provided. An automated assistant can then use these intent(s) and/or their associated parameter(s) to generate fulfillment data and to perform, based on the fulfillment data, one or more automated assistant actions on behalf of the user. By determining intent(s) and/or parameter(s) for user requests based on processing of ambient noise, occurrences of the automated assistant incorrectly resolving intent(s) and/or parameter(s). This can additionally or alternatively mitigate occurrences and/or extents of the automated assistant needing to engage in further dialog with the user in resolving intent(s) and/or parameter(s).

In some implementations, an automated assistant can process, using one or more ambient noise classification machine learning (ML) model(s), an instance of audio data that captures ambient noise, occurring during and/or within a threshold time period of a corresponding user input (e.g., a corresponding spoken utterance), to generate one or more classifications of the ambient noise. The instance of the audio data can be obtained via microphone(s) of one or more assistant devices in an environment of the user, such as the assistant device that received and/or processed the corresponding user input and/or other assistant device(s) that are in an environment with the assistant device. Such other assistant device(s) can include those that are linked with the assistant device by virtue of being associated with the same user account(s) as the assistant device and/or with the same home graph as the assistant device. The automated assistant can then process, using one or more ambient noise natural language understanding (NLU) ML model(s), a transcription (or other indication) of a user input and the one or more ambient noise classifications determined to correspond to the detected ambient noise. The automated assistant determines, based on output generated by the processing, user intent(s) and/or parameter(s) of each of those user intents. The intent(s) and/or parameter(s) will be at least selectively influenced by the ambient noise as the output, used in determining the intent(s) and/or parameter(s), is generated based on processing the ambient noise classification(s) along with the indication of the user input. The automated assistant may then use one or more fulfillment ML model(s) to generate fulfillment data for the intent(s) and then transmit and/or execute the fulfillment data to perform one or more automated assistant actions on behalf of the user.

In some implementations, the ambient noise NLU ML model 132A can be trained based on a plurality of training instances. Each of the training instances can include training instance input and training instance output. The training instance input can include, for example, an indication of corresponding user input and one or more ambient noise classifications determined based on one or more instances of audio data capturing ambient noise near or during the user input. For example, in some embodiments, the instance(s) of the audio data can be processed to generate an embedding (e.g., a lower dimensional representation) and the embedding can be compared, in embedding space, to a plurality of disparate embeddings assigned to respective ambient noise classifications. The ambient noise classification for a given instance of audio data can be determined based on a distance, in the embedding space, between the generated embedding and the plurality of disparate embeddings assigned to the respective ambient noise classifications. As another example, in some embodiments, ambient noise classification(s) for a given instance of audio data can be determined based on processing the instance of audio data using one or more other machine learning models configured to generate indication(s) of ambient noise classifications based on processing instances of audio data capturing the ambient noise. As described herein, the ambient noise classification(s) determined based on the instance(s) of the audio data can be one or more of a plurality of disparate ambient noise classifications or categories that may be defined with varying degrees of granularity. The training instance output can include, for example, an indication of one or more user intents and/or one or more parameters associated with each user intent.

Notably, in various implementations, at least some aspects of the techniques described herein can be performed entirely locally at one or more assistant devices, such that audio data, indications of ambient noise, indications of suggested automated assistant actions, and/or any other data described herein does not leave the corresponding assistant device(s). For example, generating ambient noise classification(s) can be performed entirely locally. Also, for example, generating output, by processing an indication of user input and ambient noise classification(s) using an NLU ML model, and/or determining intent(s) and/or parameter(s) based on the generated output, can be performed entirely locally.

As noted above, subsequent to training of the ambient noise NLU ML model 132A, transcriptions (or other indication(s)) of user inputs and ambient noise classifications can be processed to generate the user intent and one or more associated parameters, which are used by the automated assistant in determining and performing one or more automated assistant actions on behalf of the user. In some implementations, a corresponding representation of one or more of the suggested automated assistant actions can be provided for presentation to the user so the user can provide an approval or acceptance of one or more of the automated assistant actions. If the user accepts or approves one or more of the automated assistant actions, then the automated assistant will cause those accepted/approved actions to be performed. Additionally or alternatively, in some implementations, the automated assistant can automatically perform one or more of the determined automated assistant actions without requesting acceptance or approval from the user.

By using the techniques described herein, various technical advantages can be achieved. As one non-limiting example, by leveraging ambient noise as described herein, the user can be required to provide fewer explicit user inputs to help the automated assistant in resolving intent(s) and/or parameter(s) for user requests. As another non-limiting example, by leveraging ambient noise as described herein, robustness and/or accuracy of resolution of intent(s) and/or parameter(s) by an automated assistant can be increased. In implementations where one or more of the automated assistant actions are automatically performed on behalf of the user, explicit user inputs to perform one or more of the automated assistant actions may be further reduced. Moreover, in training the ambient noise NLU ML model 132A to generate one or more user intents and/or their associated parameter(s) for a user, the ambient noise NLU ML model 132A can more robustly and/or accurately generate one or more of the automated assistant actions that are best suited for the user given the ambient environment of the user. In these and other manners, a quantity and/or duration of user inputs that are received by one or more assistant devices can be reduced because the user can provide only reduced or simplified free-form input to cause one or more of the automated assistant actions to be performed, thereby conserving computational resources at one or more of the assistant devices and/or network resources by reducing network traffic.

The above description is provided as an overview of only some implementations of the present disclosure. Further description of those implementations, and other implementations, are described in more detail herein. As one non-limiting example, various implementations are described in more detail in the claims included herein.

DETAILED DESCRIPTION

Figure 1:
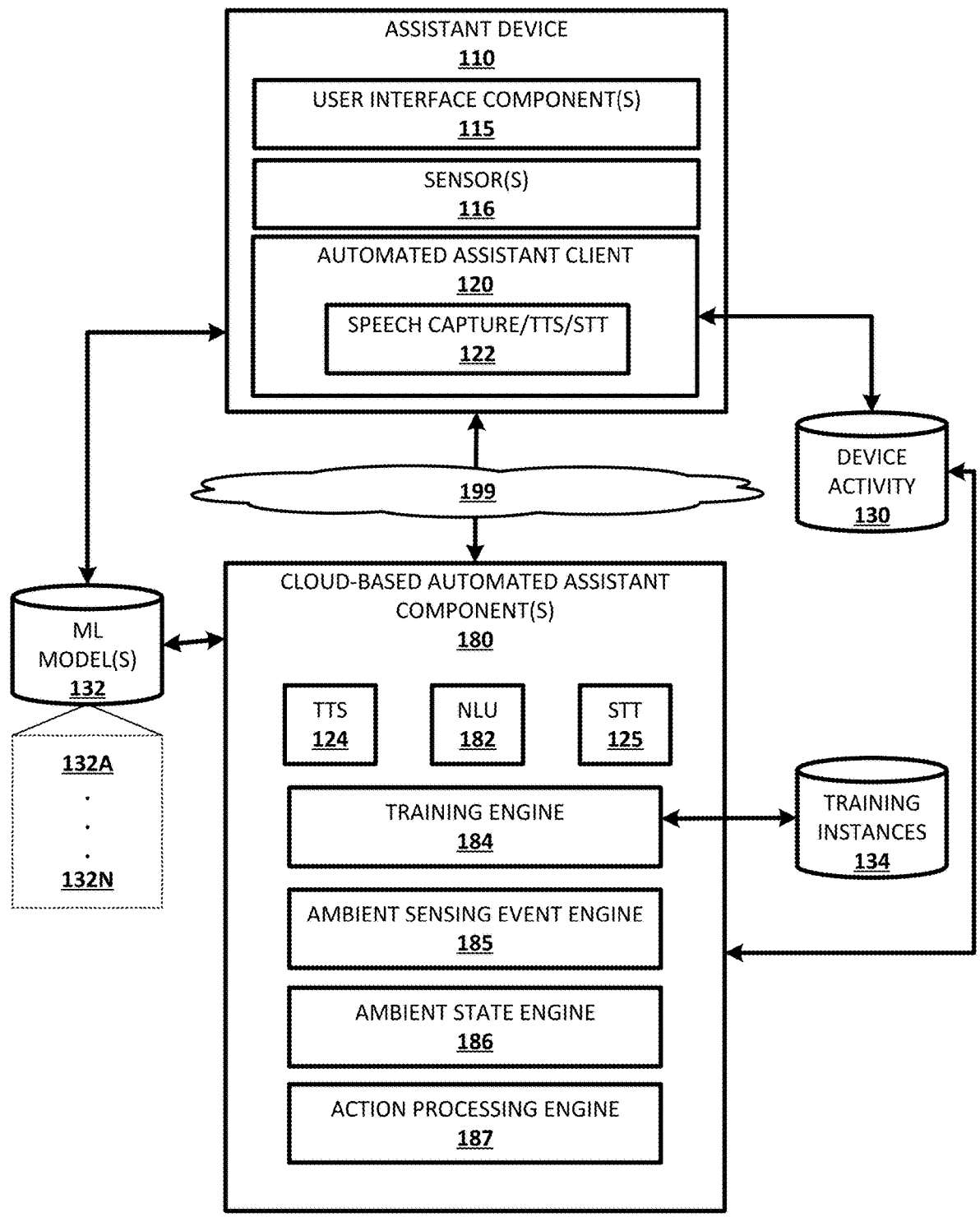
FIG. 1 is a block diagram of an example environment in which implementations disclosed herein may be implemented.

There is a proliferation of smart devices such smart phones, tablet computers, vehicle computing systems, wearable computing devices, smart televisions, interactive stand-alone speakers (e.g., with or without a display), sound speakers, home alarms, door locks, cameras, lighting systems, treadmills, thermostats, weight scales, smart beds, irrigation systems, garage door openers, appliances, baby monitors, fire alarms, moisture detectors, etc. Often, multiple assistant devices are located within the confines of a structure, such as a home—or located within multiple related structures, such as a user's primary residence and the user's secondary residence, the user's vehicle, and/or the user's work location.

Further, there is a proliferation of assistant devices that are each a smart device that includes an automated assistant client (also referred to herein as an assistant device). These assistant devices can be devoted solely to assistant functionality (e.g., an interactive standalone speaker and/or stand-alone audio/visual device including only an assistant client and associated interface, and devoted solely to assistant functionality) or can perform assistant functionality in addition to other functions (e.g., a mobile phone or tablet that includes an assistant client as one of multiple applications). Moreover, some IoT devices can also be assistant devices. For example, some IoT devices can include an automated assistant client and at least speaker(s) and/or microphone(s) that serve (at least in part) as user interface output and/or input devices for an assistant interface of the automated assistant client. Although some assistant devices may not implement the automated assistant client or have means for interfacing with a user (e.g., speaker(s) and/or microphone(s)), they may still be controlled by the automated assistant (also referred to herein as assistant non-input devices). For example, a smart light bulb may not include an automated assistant client, speaker(s), and/or microphone(s), but commands and/or requests can be transmitted to the smart light bulb, via the automated assistant, to control functionality of the smart light (e.g., turn on/off, dim, change colors, etc.).

Implementations described herein relate to determining and performing one or more automated assistant actions, on behalf of a user, via one or more assistant devices of the user. The one or more automated assistant actions can be generated based on processing, using an ambient sensing machine learning (ML) model, an ambient state classification that reflects an ambient state of the user and/or an ambient state of an environment of the user. The ambient state can be determined based on at least an instance of audio data capturing ambient noise in the environment of the user or the environment of the assistant device obtained via sensor(s) of the assistant device.

The audio data can include data from various types of audio sensors that is generated by an assistant device or one or more additional computing devices of the user accessible to the automated assistant. For example, the audio data can include audio data generated by microphone(s) that captures a spoken utterance of a user, ambient noise in the environment of the user, and/or any other audio data. Notably, the instance of the audio data is not limited to audio data corresponding to a particular instance of time. For example, the instance of the audio data can include audio data that captures a spoken utterance of a user and/or ambient noise in the environment of the user over multiple instances of time. Further, the instance of the audio data can include data generated by multiple assistant devices or computing devices in communication with assistant devices.

Ambient state classifications corresponding to ambient noise in the environment of the user and/or the environment of the assistant device can be determined based on at least the instance of the audio data. The audio data can be processed to determine the ambient state classification. For example, the audio data can be processed, using a classifier or other ambient ML model(s), to determine the ambient state classification.

Turning now to FIG. 1, an example environment in which techniques disclosed herein may be implemented is illustrated. The example environment includes an assistant device 110, one or more cloud-based automated assistant components 180, a device activity database 130, a ML model(s) database 132, and a training instances database 134.

The assistant device 110 can execute a respective instance of a respective automated assistant client 120. However, in some implementations, the assistant device 110 can optionally lack an instance of the respective automated assistant client 120, and still include engine(s) and hardware components for receiving and processing user input directed to an automated assistant (e.g., microphone(s), speaker(s), speech recognition engine(s), natural language processing engine(s), etc.). An instance of the automated assistant client 120 can be an application that is separate from an operating system of the respective assistant device 110 (e.g., installed "on top" of the operating system)—or can alternatively be implemented directly by the operating system of the respective assistant device 110.

As described further below, each instance of the automated assistant client 120 can optionally interact with one or more cloud-based automated assistant components 180 in responding to various requests provided by respective user interface components 115 of a respective assistant device 110. Further, and as also described below, other engine(s) of the client devices 110 can optionally interact with one or more of the cloud-based automated assistant components 180.

One or more the cloud-based automated assistant components 180 can be implemented on one or more computing systems (e.g., server(s) collectively referred to as a "cloud" or a "remote" computing system) that are communicatively coupled to a respective assistant device 110 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 180 with the assistant device 110 is indicated generally by 199 of FIG. 1. Also, in some implementations, the assistant device 110 may be communicatively coupled with one or more other client devices (not shown) via one or more networks (e.g., LANs and/or WANs).

An instance of an automated assistant client 120, by way of its interactions with one or more of the cloud-based automated assistant components 180, may form what appears to be, from a user's perspective, a logical instance of an automated assistant with which the user may engage in a human-to-computer dialog. It thus should be understood that a user that engages with an automated assistant client 120 executing on a assistant device 110 may, in effect, engage with his or her own logical instance of an automated assistant (or a logical instance of automated assistant that is shared amongst a household or other group of users and/or shared amongst multiple automated assistant clients 120). Although only one assistant device 110 is illustrated in FIG. 1, it is understood that cloud-based automated assistant component(s) 180 can additionally serve many additional groups of client devices. Moreover, although various engines of the cloud-based automated assistant components 180 are described herein as being implemented separate from the automated assistant client 120 (e.g., at server(s)), it should be understood that it is for the sake of example and is not meant to be limiting. For instance, one or more (e.g., all) of the engines described with respect to the cloud-based automated assistant components 180 can be implemented locally by one or more components of the assistant device 110.

The assistant device 110 may include, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant. Additional and/or alternative client devices may be provided.

In some implementations, one or more components of the automated assistant client 120 and/or the cloud-based automated assistant components 180 may be communicatively coupled to one or more other computing devices (not shown) that include one or more additional sensors (e.g., microphones, pressure sensors, presence or occupancy sensors, motion sensors, vision sensors, ambient light sensors, temperature sensors, etc.) via one or more networks (e.g., via the network(s) 199 of FIG. 1). This may be the case, for instance, when a plurality of home security devices capable of communicating with the automated assistant are deployed across different areas of a user's home. Additionally or alternatively, in some implementations, a plurality of computing devices used for sensing ambient conditions in the environment may be associated with the assistant device 110 that includes the automated assistant client 120 by virtue of them being members of a coordinated ecosystem that are at least selectively accessible by one or more users (e.g., an individual, a family, employees of an organization, other predefined groups, etc.). In some of those implementations, the ecosystem of the assistant device 110 and the plurality of computing devices used for sensing ambient conditions in the environment can be manually and/or automatically associated with each other in a device topology representation of the ecosystem. The plurality of computing devices used for sensing ambient conditions can include one or more first-party (1P) devices and systems and/or one or more third-party (3P) devices and systems. A 1P device or system references a system that is controlled by a party that is the same as the party that controls the automated assistant referenced herein. In contrast, a 3P device or system references a system that is controlled by a party that is distinct from the party that controls the automated assistant referenced herein. The plurality of computing devices used for sensing ambient conditions can selectively transmit data (e.g., state(s), state change(s), and/or other data) to the automated assistant over the network(s) 199, and optionally via corresponding assistant non-input system(s).

The assistant device 110 further includes respective user interface component(s) 115, which can include one or more user interface input devices (e.g., microphone, touchscreen, keyboard, and/or other input devices) and/or one or more user interface output devices (e.g., display, speaker, projector, and/or other output devices). Additionally, in some implementations, one or more other computing devices used for sensing ambient conditions in the environment that are communicatively coupled to the automated assistant may include one or more user interface input devices and/or one or more user interface output devices of the user interface component(s) 115. However, in some implementations, these user input devices (if any) may not allow the user to directly interact with the automated assistant.

The assistant device 110 and/or any other computing device(s) operating one or more of the cloud-based automated assistant components 180 may include one or more memories for storage of data and software applications, one or more processors for accessing data and executing applications, and other components that facilitate communication over a network. The operations performed by the assistant device 110 and/or by the automated assistant may be distributed across multiple computer systems. The automated assistant may be implemented as, for example, computer programs running on one or more computers in one or more locations that are coupled to each other through a network (e.g., the network(s) 199 of FIG. 1).

As noted above, in various implementations, the assistant device 110 may operate a respective automated assistant client 120. In various embodiments, the automated assistant client 120 may include a respective speech capture/text-to-speech (TTS)/speech-to-text (STT) module 122 (also referred to herein simply as "speech capture/TTS/STT module 122"). In other implementations, one or more aspects of the respective speech capture/TTS/STT module 122 may be implemented separately from the respective automated assistant client 120 (e.g., by one or more of the cloud-based automated assistant components 180).

The speech capture/TTS/STT module 122 may be configured to perform one or more functions including, for example: capture a user's speech (speech capture, e.g., via respective microphone(s)), convert that captured audio to text and/or to other representations or embeddings (STT) using speech recognition model(s) stored in the ML model (s) database 132; and/or convert text to speech (TTS) using speech synthesis model(s) stored in the ML model(s) database 132. Instance(s) of these machine learning model(s) may be stored locally at the assistant device 110 and/or accessible by the assistant device 110 (e.g., over the network(s) 199 of FIG. 1). In some implementations, because the assistant device 110 may be relatively constrained in terms of computing resources (e.g., processor cycles, memory, battery, etc.), the respective speech capture/ TTS/STT module 122 that is local to the assistant device 110 may be configured to convert a finite number of different spoken phrases to text (or to other forms, such as lower dimensionality embeddings) using the speech recognition model(s). Other speech input may be sent to one or more of the cloud-based automated assistant components 180, which may include a cloud-based TTS module 124 and/or a cloud-based STT module 125.

Cloud-based STT module 125 may be configured to leverage the virtually limitless resources of the cloud to convert audio data captured by speech capture/TTS/STT module 122 into text (which may then be provided to natural language processing (NLP) module 182) using speech recognition model(s) stored in the ML model(s) database 132. Cloud-based TTS module 124 may be configured to leverage the virtually limitless resources of the cloud to convert textual data (e.g., text formulated by the automated assistant) into computer-generated speech output using speech synthesis model(s) stored in the ML model(s) database 132. In some implementations, the cloud-based TTS module 124 may provide the computer-generated speech output to the assistant device 110 or another computing device communicatively coupled to the cloud-based automated assistant component(s) 180 to be output directly, e.g., using respective speaker(s) of the respective computing devices. In other implementations, textual data (e.g., a client device notification included in a command) generated by the automated assistant using the cloud-based TTS module 124 may be provided to speech capture/TTS/STT module 122 of the assistant device 110, which may then locally convert the textual data into computer-generated speech using the speech synthesis model(s), and cause the computer-generated speech to be rendered via local speaker(s) of the assistant device 110.

The NLP module 182 processes natural language input generated by a user via the assistant device 110 and may generate annotated output for use by one or more other components of the automated assistant, the assistant device 110, and/or one or more other computing devices communicatively coupled to the automated assistant or the assistant device 110. For example, the NLP module 182 may process natural language free-form input that is generated by a user via one or more respective user interface input devices of the assistant device 110. The annotated output generated based on processing the natural language free-form input may include one or more annotations of the natural language input and optionally one or more (e.g., all) of the terms of the natural language input. As described in more detail herein, the NLU engine 182 can at least selectively use ambient noise classifications corresponding to ambient noise detected in the environment of the user and/or the assistant device 110 (or another computing device accessible to the automated assistant) in processing free-form natural language user inputs. The NLU engine 182 can also selectively process some free-form natural language user inputs without consideration of any ambient noise detected in the environment.

In some implementations, the NLP module 182 is configured to identify and annotate various types of grammatical information in natural language input. For example, the NLP module 182 may include a part of speech tagger configured to annotate terms with their grammatical roles. In some implementations, the NLP module 182 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 182 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 182 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 182 may rely on annotations from one or more other components of the NLP module 182. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 182 may use related data outside of the particular natural language input to determine one or more annotations—such as a client device notification rendered immediately prior to receiving the natural language input on which the client device notification is based.

In various implementations, the one or more cloud-based automated assistant components 180 may further include various engines. For example, as shown in FIG. 1, the one or more cloud-based automated assistant components 180 may further include a training engine 184, an audio engine 185, an ambient noise event engine 185, an ambient state engine 186, and an action processing engine 187. Although these various engines are depicted as the one or more cloud-based automated assistant components 180 in FIG. 1, it should be understood that is for the sake of example and is not meant to be limiting. For example, the assistant device 110 may include one or more of these various engines. As another example, these various engines can be distributed across the assistant device 110 and/or the one or more cloud-based automated assistant components 180. As one particular example, training engine 184 can be implemented by cloud-based automated assistant component(s) 180, but engines 185, 186, and 187 can be implemented exclusively locally at assistant device 110 (and other instance(s) of 185, 186, and 187 implemented exclusively at other assistant devices).

In some implementations, the training engine 184 can generate one or more training instances that are utilized to train an ambient noise natural language understanding ("NLU") ML model. Each of the training instances can include training instance input and training instance output. The training instance input can include indications of user inputs (e.g., transcripts of spoken user inputs) and determined classifications for one or more significant ambient states of the environment user or of the environment of the assistant device 110. For example, the training instance inputs can include a transcription of a spoken user input and indication(s) of one or more classes or categories assigned to one or more instances of ambient noise captured by one or more microphones of the assistant device 110 shortly before, during, or shortly after the user provided the spoken user input. The training instance output can include indication(s) of one or more user intents and one or more respective parameters for each of those user intent(s). For example, the training instance output may include an annotated transcript of the spoken user input, the transcript of the spoken input being annotated based on the classifications for the ambient noise and various other context signals available to the automated assistant (e.g., a user or device account profile, a user-assistant interaction history, other audio data, etc.). The classification(s) of the ambient noise used in the training instance input may correspond to one or more classes or categories of ambient states detected in the audio data. In various implementations, one or more of the training instances can be stored in one or more databases (e.g., the training instance(s) database 134). In additional or alternative implementations, the training engine 184 can obtain one or more training instances (e.g., the training instance inputs and/or the training instance outputs) from one or more sources (e.g., a 1P source and/or 3P source), from one or more application programming interfaces (APIs) that can be utilized as training instance input for a given training instance. In some implementations described herein, the ambient noise NLU ML model 132A may be an end-to-end neural network capable of processing the audio data that captures the audible user input(s) and the ambient noise in order to generate outputs indicating corresponding user intent(s) and associated parameter(s). In some such embodiments, the training instances may use the audio data capturing both the audible user input(s) and the ambient noise as training instance inputs and the corresponding user intent(s) and associated parameter(s) as training instance outputs. In other such embodiments, the audio data capturing the audible user input(s) may be isolated from the audio data capturing the ambient noise (e.g., transformed and/or filtered), and the user input audio data (or a transcript of such) and the ambient noise audio data can be used as separate training instance inputs for a given training instance, with the corresponding user intent(s) and associated parameter(s) being the training instance outputs for the given training instance. As described herein, the ambient noise NLU ML model 132A described herein is trained (based on one or more of the training instances) and then used by one or more components of the automated assistant, such as NLU engine 182, to generate user intents and associated parameters (or indications of such) based on user inputs and associated ambient noise. The automated assistant can then use these user intent(s) and associated parameter(s) to determine which automated assistant actions to perform and to perform such actions in response to the spoken user input.

In some implementations, the training engine 184 may only generate one or more of the training instances based on a given detected instance of ambient noise if the audio data corresponding to the given instance of ambient noise corresponds to an ambient noise event. For example, the automated assistant can cause the ambient noise event engine 185 to process the given instance of the audio data to determine whether it does, in fact, correspond to an ambient noise event. The ambient noise event engine 185 can determine the given instance of the audio data corresponds to an ambient noise event based on, for example, the given instance of the audio data including audio data that captures a particular noise and/or noise above a threshold noise level (e.g., captured via one or more microphones as described above). Although the training engine 184 may only generate one or more of the training instances if the given instance of the audio data corresponds to an ambient noise event, it should be noted that the given instance of the audio data can include audio data captured shortly before, during, and/or shortly after it is determined the given instance of audio data corresponds to the ambient noise event. For example, audio data can be stored in some short-term memory (e.g., a buffer or other short-term memory) for a threshold duration of time. If it is determined that the given instance of the audio data does, in fact, correspond to an ambient noise event, the audio data can be retrieved from the short-term memory and utilized in determining an ambient state.

In other words, the ambient noise event engine 185 can prevent training instances from being generated based on happenstance ambient audio data such that the resulting training instances do, in fact, correspond to ambient noise events for which one or more automated assistant actions should be performed. For example, assume the instance of the audio data includes audio data that is captured via microphones of a given assistant device located in a primary dwelling of a user. Further assume the audio data is processed using a classifier or other ambient ML model(s) stored in the ML model(s) database 132 that is trained to classify ambient noise captured in audio data into one or more disparate classes or categories. Further assume that it is determined the audio data captures the sound of cars driving by, but the noise caused by the cars driving by fails to satisfy a noise threshold. In this example, the noise caused by the cars may be due to the user opening the windows near a busy street. Accordingly, the sound of cars driving by should not be considered an ambient noise event for the user or the environment of the user.

In some implementations, the ambient state engine 186 can determine a classification corresponding to a particular ambient state based on an instance of audio data and its associated temporal data (and optionally in response to the ambient noise event engine 185 determining the instance of the audio data does, in fact, correspond to an ambient noise event). The classification of the ambient state can be utilized as training instance input for a given training instance. The classification of the ambient state can reflect a class or category of an ambient state of a user or an environment of the user. The classification of the ambient state can be one of a plurality of disparate ambient state classifications that may be defined with varying degrees of granularity as described herein. In versions of those implementations, the ambient state engine 186 can determine the classification of an ambient state directly based on the instance of the audio data. In additional or alternative implementations, the ambient state engine 186 can process the instance of the audio data using various classifier(s) and/or ambient ML model(s) stored in the ML model(s) database to determine and/or classify the ambient state.

For example, in some implementations, the ambient state engine 186 can utilize one or more of the ambient noise classification ML model(s) 132N stored in the ML model(s) database 132 to process the audio data that captures the ambient noise in the environment of the user and/or in the environment of the assistant device 110 in order to determine a classification for a given ambient state associated with the ambient noise. The ambient noise classification ML model(s) 132N can be trained using, for example, supervised learning techniques. For example, a plurality of training instances can be obtained. Each of the training instances can include training instance input that includes audio data capturing ambient noise, and training instance output that includes an indication of whether the training instance input includes the particular sound(s) for which the ambient noise detection and/or classification model(s) are being trained to classify. For example, if a given ambient noise classification model is being trained to classify kitchen noises, positive training instances that include the sound of food cooking, dishes clinking, etc. can be assigned a descriptive classification label (e.g., "dishes clinking", "hot oil popping", etc.) or a value classification label (e.g., "Yes" or "1") and negative training instances that do not include kitchen sounds can be assigned a different descriptive label (e.g., "No" or a classification label associated with another ambient state, such as "Television", "Workout", etc.) or value label (e.g., "No" or "0"). Instances of audio data capturing ambient noise may be processed by a network of such trained classification models, and the output of the network can include indication(s) of one or more ambient noise classifications that correspond to the ambient noise of the audio data.

In some implementations, one or more other ambient noise classification ML model(s) 132N stored in ML model database 132 can be utilized to generate an audio embedding (e.g., a lower-dimensional representation of the instances of the ambient noise, such as an embedding) based on the audio data (or acoustic features thereof, such as mel-Cepstral frequency coefficients, raw audio waveforms, and/or other acoustic features). These embeddings can be points within an embedding space where similar sounds (or acoustic features that capture the sounds) are associated with the same or similar portions of the embedding space. Further, these portions of the embedding space can be associated with one or more of the plurality of disparate ambient state classification labels, and a given one of the embeddings can be classified as belonging to a given ambient state classification if a distance metric between the given one of the embeddings and one or more of the portions of the embedding space satisfies a distance threshold. For instance, instances of food cooking can be associated with a first portion of the embedding space that is associated with "food cooking" sounds, instances of dishes clinking can be associated with a second portion of the embedding space that is associated with a "dishes clinking" sounds, instances of cars driving by can be associated with a third portion of the embedding space that is associated with "vehicle operation"

sounds, and so on. In this example, the first portion of the embedding space corresponding to the "food cooking" sounds and the second portion of the embedding space corresponding to "dishes clinking" sounds may be relatively close in the embedding space since they are "kitchen noises". However, the third portion of the embedding space may be relatively further away in the embedding space since it corresponds to "vehicle operation" sounds.

In some implementations, the training engine 184 can utilize one or more of the training instances to train the ambient noise NLU ML model 132A (e.g., using supervised learning techniques). The ambient noise NLU ML model 132A can be a neural network, for example, a convolutional model, long short-term memory (LSTM) model, transformer model, and/or any other model that can process indications of user input(s) and classification(s) of ambient state(s) detected in audio data to generate one or more user intents and one or more respective parameters for each user intent. For example, for a given training instance, the training engine 184 can cause the ambient noise NLU ML model 132A to process the training instance input. In processing the training instance input, the ambient noise NLU ML model 132A can generate an indication of one or more user intents and their associated parameters determined based on the user inputs and ambient state classifications included in the training instance input. The predicted user intents and/or their associated parameters can be compared to the indication(s) of the user intents and/or their associated parameters indicated by training instance output to generate one or more losses. Further, the ambient noise NLU ML model 132A can be updated based on one or more of the losses. For example, if the user intent(s) and their associated parameters indicated by the training instance output differ from the predicted user intent(s) and/or their associated parameters, then one or more losses may be generated. However, if the predicted user intent(s) and/or their associated parameters are the same as the user intent(s) and/or their associated parameters indicated by the training instance output, then the one or more losses may be zero or near zero.

In some versions of those implementations, each of the predicted user intents (and/or their associated parameters) can be associated with a corresponding predicted measure. The corresponding predicted measures can be, for example, a corresponding probability, log likelihood, binary value, and/or any other measure indicative of whether a given predicted user intent (and/or its associated parameters) will match the intent of the user who spoke the spoken input. In these implementations, the one or more losses can additionally or alternatively be based on the predicted measures and used to train the ambient noise NLU ML model 132A and/or one or more ambient sensing classification ML model(s) used to determine the classifications. For example, the user intent and associated parameter(s) predicted based on a given instance of training instance input may include a user intent of "Provide TV Show" with a confidence level of 0.9 (e.g., on a scale from 0 to 1) and a parameter of "Children's Cartoon Show" with a confidence level of 0.6 based on detecting ambient noise classified as "Children Laughing" in the environment of the user when the user provided a spoken utterance of "Put something on TV". In this example, however, the training instance output corresponding to this training instance input indicated a user intent of "Provide TV Show" and an associated parameter of "Family-Friendly Shows" (e.g., shows that are known to be enjoyed by people of all ages or families with members of all ages), which may indicate absolute confidence (e.g., associated with a ground truth measure or probability of 1.0). Thus, one or more losses can be generated that indicate that "Children's Cartoon Show" should have never been predicted as a parameter for the "Provide TV Show" user intent, and further based on differences between the predicted measures and training instance measures.

In some implementations, and subsequent to training the ambient noise NLU ML model 132A (and/or the ambient sensing classification ML model(s)), the automated assistant can cause the NLU engine 182 to utilize the ambient noise NLU ML model 132A (and/or the ambient sensing classification ML model(s)) in generating an indication of a user intent and/or one or more parameters corresponding for the user intent from user inputs (e.g., processing audio data capturing or a transcription of a spoken user input) and associated ambient noise in the environment of the user or the environment of the assistant device 110. The NLU engine 182 can generate one or more indications of potential user intents, and/or parameters associated with such intents, based on processing instances of audio data capturing user inputs (or transcripts of such) and instances of audio data capturing ambient noise occurring in the environment of the user (or classifications of such).

For example, in some implementations, the NLU engine 182 may use one or more automatic speech recognition ("ASR") ML model(s) stored in ML Model(s) Database 132 to generate a transcription of a spoken user input based on processing audio data that includes that spoken user input. The NLU engine 182 can use one or more of the ambient sensing classification ML model(s) stored in ML model(s) database 132 to generate ambient state classification labels for one or more instances of audio data determined to correspond to ambient noise events. The NLU engine 182 can then provide, as input to the ambient noise NLU ML model 132A(s), the transcription of the spoken user input and indications of the ambient state classifications. The ambient noise NLU ML model(s) 132A will then provide, as output, indication(s) of one or more user intents and one or more respective parameters for each of those user intents. The user intent(s) and their associated parameter(s) may then be provided to action processing engine 187 for determining one or more automated assistant actions to perform on behalf of the user and in response to the spoken user input.

As another example, in some implementations, the NLU engine 182 may provide the audio data that captures the spoken user input and the ambient noise directly to the ambient noise NLU ML model(s) 132A, which may be trained, as described herein, to process the audio data in order to generate the user intent(s) and associated parameter(s). The audio data provided to the ambient noise NLU ML model(s) 132A as input(s) may include audio data that captures both the spoken user input and the ambient noise, or separate instances of audio data each capturing either the spoken user input or the ambient noise (e.g., generated based on transforming and/or filtering the audio data capturing both). Additionally or alternatively, in some implementations, the NLU engine 182 may use one or more of the ASR ML model(s) stored in ML Model(s) Database 132 to generate a transcription of a spoken user input based on processing audio data that includes that spoken user input. The NLU engine 182 may then provide the transcript of the spoken user input and the audio data capturing the ambient noise to the ambient noise NLU NL model(s) 132A as inputs. The ambient noise NLU ML model(s) 132A then provide, as output(s), indications of the corresponding user intent(s) and their associated parameter(s).

The action processing engine 187 receives the NLU data including the predicted user intent(s) and their associated parameter(s) and uses this NLU data to determine and initiate one or more automated assistant actions that correspond to the predicted user intent(s) and their associated parameter(s). The action processing engine 187 can generate automated assistant fulfillment data using one or more fulfillment ML model(s), which may for example be stored in ML Model(s) Database 132, based on processing the NLU data. This fulfillment data can define local and/or remote responses (e.g., answers) to spoken utterances provided by a user of the assistant device 110, interaction(s) to perform with locally installed application(s) based on the spoken utterances, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing an on-device TTS module)), interacting with locally installed applications, transmitting command(s) to IoT device(s), and/or other action(s).

In some versions of those implementations, the automated assistant can cause an indication of one or more suggested automated assistant actions to be provided for presentation to a user. For example, a corresponding selectable graphical element can be visually rendered for presentation to the user via a display the assistant device 110 or another computing device of the user that is associated with the automated assistant. The corresponding selectable graphical elements can be associated with a disparate one of the suggested automated assistant actions and/or associated with each of the one or more suggested automated assistant actions (e.g., as a routine to be performed by the automated assistant). In this example, the action processing engine 187 can initiate performance of one or more of the suggested automated assistant actions based on a user selection of one or more of the corresponding selectable graphical elements (e.g., generate fulfillment data and transmit it and/or execute it). As another example, synthesized speech audio data that includes synthesized speech having an indication of the one or more suggested automated assistant actions can be audibly rendered for presentation to the user via speaker(s) of the assistant device 110 or another computing device associated with the user and the automated assistant. The synthesized speech can include an indication of the one or more suggested automated assistant actions. In this example, the action processing engine 187 can initiate performance of one or more of the suggested automated assistant actions based on processing spoken input that is responsive to the synthesized speech and that selects one or more of the suggested automated assistant actions (e.g., generate fulfillment data and transmit it and/or execute it).

In some additional or alternative versions of those implementations, one or more of the automated assistant actions can be automatically performed by the automated assistant, without requiring user acceptance or approval. Causing one or more of the automated assistant actions to be automatically performed by the automated assistant can be based on, for example, corresponding predicted measures associated with one or more of the automated assistant actions satisfying a threshold. In other words, if the automated assistant is sufficiently confident that the user desires the automated assistant perform a given automated assistant action, then the automated assistant can automatically perform the automated assistant action without causing the indication of the automated assistant action to be provided for presentation to the user. In these implementations, the automated assistant can cause the action processing engine 187 to initiate performance of one or more of the automated assistant actions that are to be automatically performed without causing an indication of one or more of the automated assistant actions to be provided for presentation to a user. However, the automated assistant can cause the assistant device 110, or another computing device associated with the user and the automated assistant, to provide a notification to the user as to why one or more of the automated assistant actions are being automatically performed (e.g., "It sounds like you need help changing a tire on the interstate, I've alerted roadside assistance to your location, they'll be there soon to assist you").

Although FIG. 1 is depicted as having a particular configuration of components implemented by the assistant devices and/or server(s), and is depicted having the assistant devices and/or server(s) communicating over particular networks, it should be understood that is for the sake of example and is not meant to be limiting. For example, operations of the one or more cloud-based automated assistant components 180 can be implemented entirely locally at the client device. As another example, instance(s) of various ML models stored in the ML model(s) database 132 may be stored locally at the assistant device 110 or at another computing device associated with the user and the automated assistant. Accordingly, the techniques described herein can be implemented entirely locally at one or more client devices 110 of the user. Further, in implementations where data (e.g., device activity, audio data or recognized text corresponding thereto, and/or any other data described herein) is transmitted over any of the one or more networks 199 of FIG. 1, the data can be encrypted, filtered, or otherwise protected in any manner to ensure privacy of user(s).

By using the techniques described herein, various technical advantages can be achieved. For instance, when a user requests that the automated assistant perform some automated assistant action(s), explicit user inputs can be simplified. As one example, a user can merely provide spoken input of "Help!", and the automated assistant can determine what the user needs help with and in what manner based on ambient noises detected in the background shortly before, during, and/or shortly after the user provided the spoken input. Explicit user inputs are further reduced in implementations in which automated assistant actions are performed automatically on behalf of the user, without first requiring user acceptance or approval of performance of the automated assistant actions. Moreover, in training the ambient noise NLU ML model 132A to generate one or more of the user intents and/or their associated parameters based on ambient state classifications and temporally corresponding user inputs, the ambient noise NLU ML model 132A can more robustly and/or accurately generate the one or more automated assistant actions that are best suited for the user given their current environment. As a result, a quantity and/or duration of user inputs that are received by one or more client devices can be reduced because the user can provide simpler and shorter free-form input to cause one or more automated assistant actions to be performed, thereby conserving computational resources at client devices and/or network resources by reducing network traffic.

Although the above examples are described with respect to audio data, it should also be appreciated that ambient state classifications, as well as user intent(s) and associated parameter(s), can be determined in a similar manner for other types of sensor data. For example, ambient state classifications may additionally or alternatively be determined based on corresponding location, motion, or image/video data. Indications of location, motion, and/or image/video data may be provided to one or more of the machine learning models of ML model(s) database 132 trained to classify these types of sensor data (and/or to determine user intent(s) and parameter(s) based off such) in a similar manner described above (e.g., the training instances used to train the model(s) additionally or alternatively include indications of these other types of sensor data, as well as corresponding classifications and/or user intent(s) and parameter(s)).

For example, assume a user is located outside his or her primary dwelling, and motion data is generated via GPS sensors and/or accelerometers of the mobile phone. Further assume the motion data is processed, using an ambient sensing classification machine learning model, to generate output classifying the motion data as capturing the user walking. Meanwhile, the user provides the spoken user input of "Hey assistant, let's go!". One or more of the ML model(s) described herein may process the spoken user input (or a transcript of such) along with the ambient state classification of "walking", and provide the automated assistant with a predicted user intent of, for example, "listen to music" and a parameter of "workout playlist". Thus, the automated assistant may respond to the user by playing their workout playlist. As another example, assume the same motion data and audio data in the preceding example is used, and additionally audio data capturing ambient noise including a dog barking and dog collar tags jingling is captured. In this example, the motion data is assigned a "walking" classification as before, and the additional audio data that captures the ambient noise is assigned "dog barking" and "dog collar moving" classifications. Now, in response to the user saying "Hey assistant, let's go!", one or more of the ML model(s) described herein will provide the automated assistant with a user intent of, for example, "dog-friendly places" and parameters of "nearby [user's location]". Thus, the automated assistant responds to the user by providing the user with directions to the nearest dog-friendly park.

Figure 2:
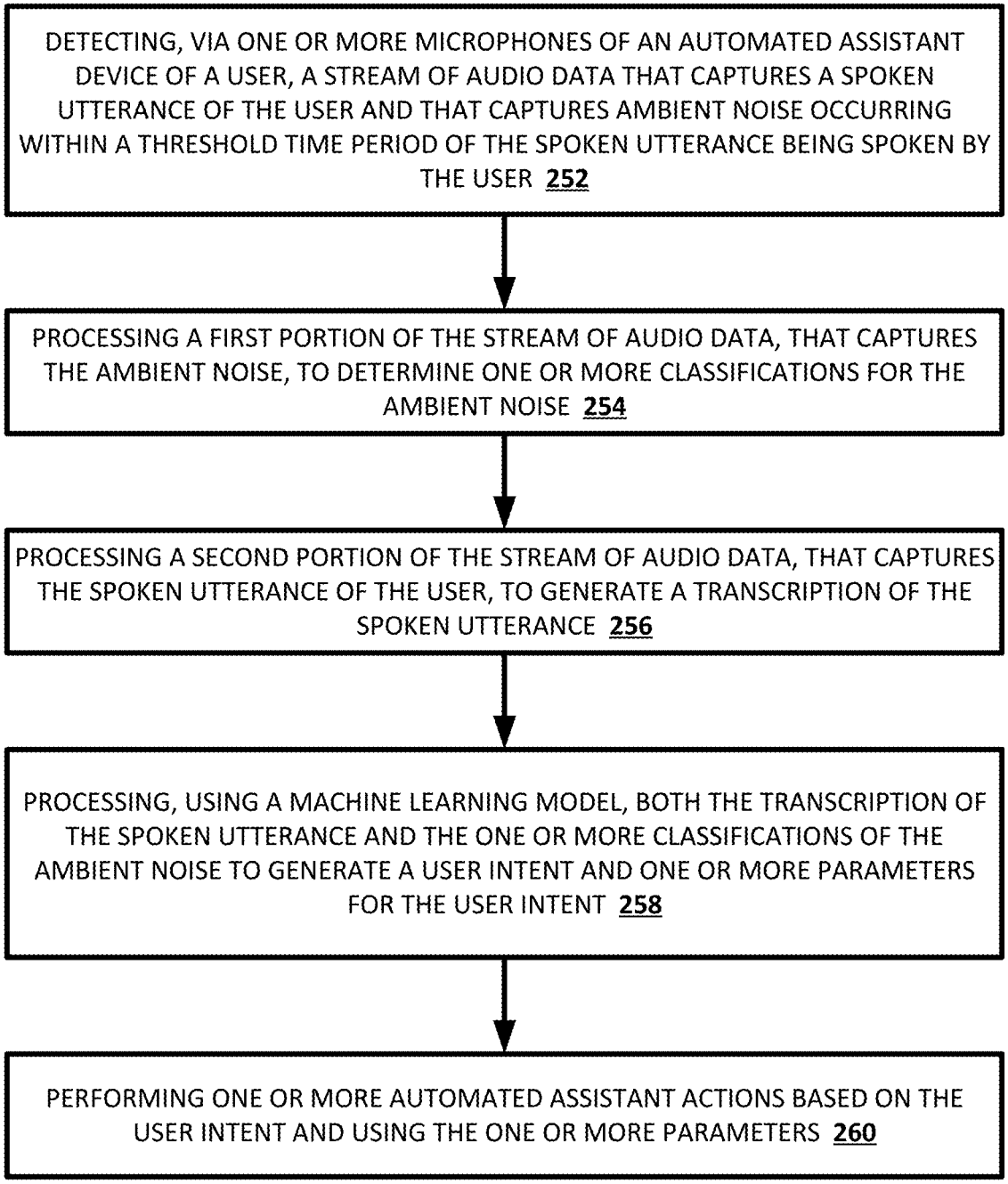
FIG. 2 is a flowchart illustrating an example method of determining and performing one or more automated assistant actions based on a spoken user input and ambient noise detected in the environment of the user or the environment of the client device, in accordance with various implementations described herein.

Turning now to FIG. 2, a flowchart illustrating an example method 200 of determining and performing one or more automated assistant actions based on a spoken user input and ambient noise detected in the environment of the user or the environment of the client device. For convenience, the operations of the method 200 are described with reference to a system that performs the operations. The system of the method 200 includes one or more processors and/or other component(s) of a computing device. For example, the system of the method 200 can be implemented by an assistant device 110 and/or one or more of the cloud-based automated assistant component(s) 180 of FIG. 1, one or more servers, other computing devices, and/or any combination thereof. Moreover, while operations of the method 200 are shown in a particular order, this is not meant to be limiting. One or more operations may be reordered, omitted, and/or added.

At block 252, the system detects, via one or more microphones of an automated assistant device of a user, a stream of audio data that captures a spoken utterance of the user and that captures ambient noise occurring within a threshold time period of the spoken utterance being spoken by the user. The stream of audio data can capture spoken utterances of one or more users and ambient noise occurring within a threshold time period of a spoken utterance (e.g., within a window of time shortly before, during, and shortly after a spoken utterance is provided).

At block 254, the system processes a first portion of the stream of audio data, that captures the ambient noise, to determine one or more classifications for the ambient noise. The first portion of the stream of audio data is not necessarily the portion of audio data occurring first in the stream. Rather, "the first portion" is used herein to describe all portions of the audio data that include ambient noise determined to correspond to an ambient noise event (e.g., the audio data capturing one or more particular noises and/or noise above a threshold noise level). In some implementations, the first portion of the stream of audio data may exclude any portions of the stream of audio data that include the spoken utterance of the user. For example, the stream of audio data may be filtered and/or transformed to isolate the ambient noise, and only the portions of the recording that capture the ambient noise (and their associated temporal indications) will be considered "the first portion". The one or more classifications for the various instances of ambient noise detected in the first portion of the stream of audio data and determined to correspond to ambient noise events include one or more ambient state class or category labels determined to apply to those ambient states by the automated assistant, using one or more of the ML model(s) and/or embedding systems described herein. In some implementations, the one or more classifications for the ambient noise may be determined before or while the user is speaking the spoken utterance and/or while the system is still capturing the spoken utterance of the user via one or more microphones of an assistant device.

At block 256, the system processes a second portion of the stream of audio data that captures the spoken utterance of the user, to generate a transcription of the spoken utterance. Again, the second portion of the stream of audio data is not necessarily the portion of audio data occurring after any other portion of the stream of audio data. Rather, "the second portion" is used herein to describe all portions of the audio data that include the spoken utterance of the user. In some implementations, the second portion of the stream of audio data may exclude any portions of the stream of audio data that include ambient noise detected in the environment of the user. For example, the stream of audio data may be filtered and/or transformed to isolate the spoken utterance from any ambient noise, and only the portions of the recording that capture the spoken utterance (and their associated temporal indications) will be considered "the second portion". The automated assistant may use one or more of the language processing models described herein to generate the transcription of the spoken utterance. one or more classifications for the various instances of ambient noise detected in the first portion of the stream of audio data and determined to correspond to ambient noise events include one or more ambient state class or category labels determined to apply to those ambient states by the automated assistant, using one or more of the ML model(s) and/or embedding systems described herein.

At block 258, the system processes, using a machine learning model, both the transcription of the spoken utterance and the one or more classifications of the ambient noise to generate a user intent and one or more parameters for the user intent. The system may use, for example, one or more of the machine learning models described herein, such as the ambient noise NLU ML model 132A(s) to process the transcription and the one or more classifications.

At block 260, the system performs one or more automated assistant actions based on the user intent and using the one or more parameters. The system can generate fulfillment data based on the user intent and the one or more parameters and transmit and/or execute the fulfillment data to cause performance of one or more automated assistant actions, as described herein.

Figure 3A:
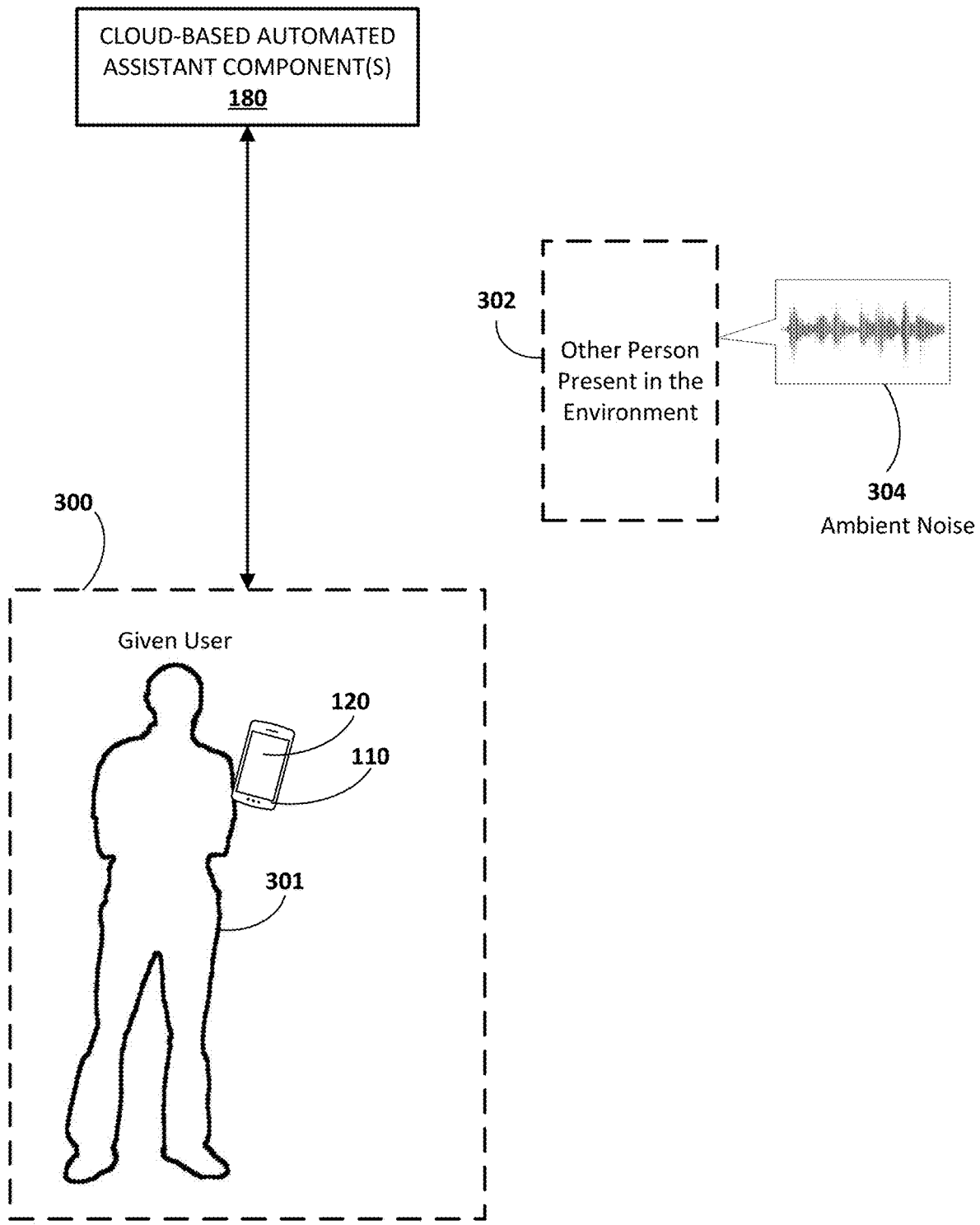
FIG. 3A, FIG. 3B, and FIG. 3C depict various non-limiting examples of user interactions with an automated assistant that is using one or more ambient noise NLU ML model 132A(s), in accordance with various implementations described herein.
Figure 3B:
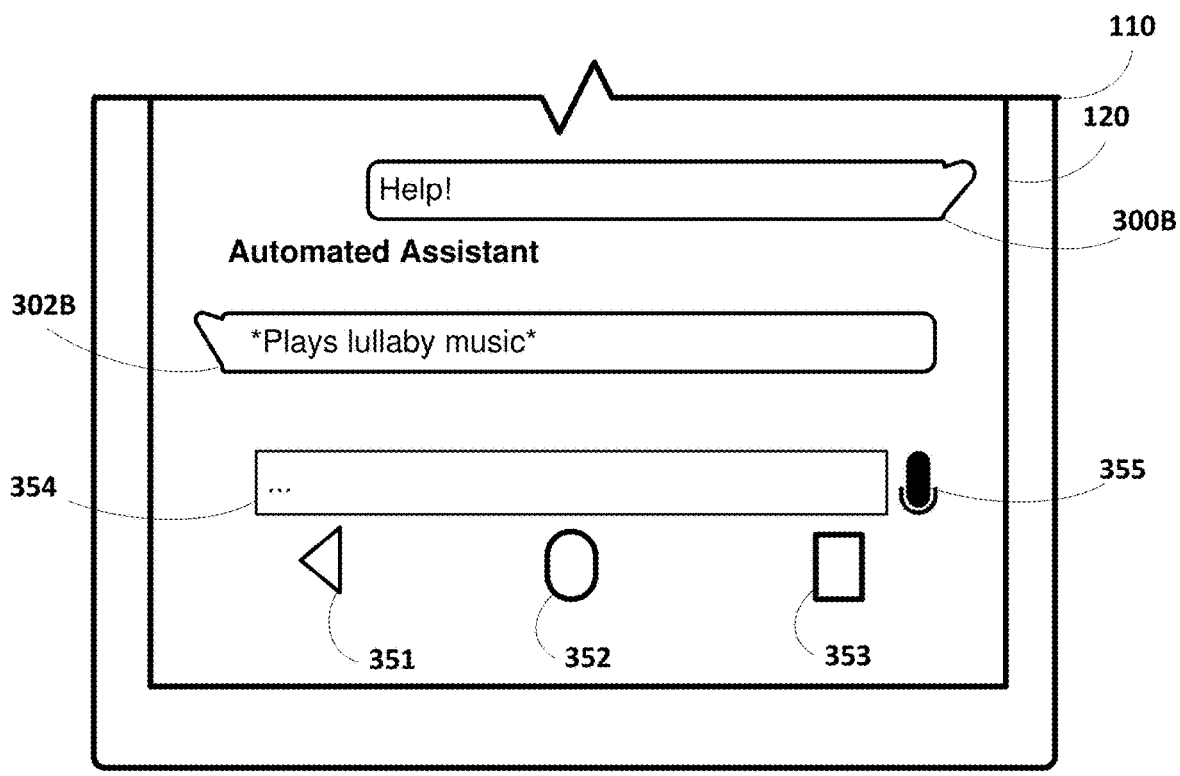
Figure 3C:
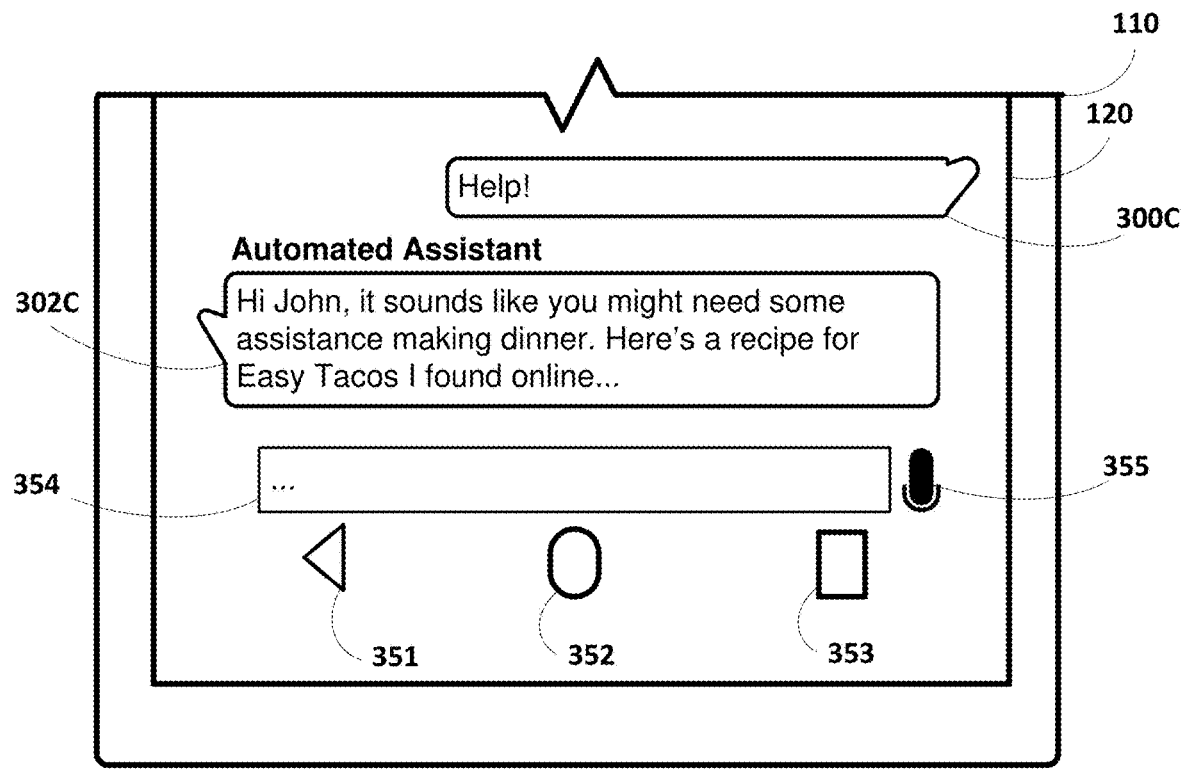

Turning now to FIGS. 3A, 3B, and 3C, various non-limiting examples of user interactions with an automated assistant that is using one or more ambient noise NLU ML model 132A(s) are provided. The automated assistant can implement a one or more of the components component(s) and/or engines depicted in FIG. 1 locally at assistant device 110 and/or remotely at one or more servers in communication with the assistant device 110 over network(s) (e.g., the networks 199 of FIG. 1). FIG. 3A depicts user interactions with an automated assistant in an example environment that includes ambient noise, as described herein. FIG. 3B depicts an example user interface of an automated assistant client 120 executing on the assistant device 110 of the user during user interactions between the user, in the example environment of FIG. 3A, and the automated assistant. FIG. 3C depicts an example user interface of an automated assistant client 120 executing on the assistant device 110 of the user during user interactions between the user, in a different example environment with different ambient noise occurring, and the automated assistant.

The assistant device 110 depicted in FIGS. 3A, 3B, and 3C may include various user interface components including, for example, microphone(s) to generate audio data based on spoken utterances and/or other audible input, speaker(s) to audibly render synthesized speech and/or other audible output, and a display to receive touch input and/or to visually render transcriptions and/or other visual output. Further, the display of the assistant device 110 includes various system interface elements 351, 352, 353 (e.g., hardware and/or software interface elements) that may be interacted with by a user (e.g., the user 301 of FIG. 3A) to cause the assistant device 110 to perform one or more actions. The automated assistant client 120 of the assistant device 110 enables the user to interact with content rendered on the display by touch input (e.g., by directing user input to the display or portions thereof) and/or by spoken input (e.g., by selecting microphone interface element 355—or just by speaking without necessarily selecting the microphone interface element 355 (i.e., the automated assistant may monitor for one or more terms or phrases, gesture(s) gaze(s), mouth movement(s), lip movement(s), and/or other conditions to activate spoken input) at the assistant device 110).

For example, and with respect to FIG. 3A, assume a user 301 and an additional person 302 (e.g., the user's child) are relatively close to one another as well as to assistant device 110 in the living room of the user's 301 home. Assume the child 302 of the user 301 is crying quite loudly in the background while the user 301 interacts with the automated assistant via the automated assistant client 120 executing on the assistant device 110 of the user. One or more of the microphone(s) of the assistant device 110 capture the ambient noise 304 of the child 302 crying and store it in an audio buffer, to be sent to one or more of the cloud-based automated assistant component(s) 180 for processing along with any spoken utterances of the user 301 captured shortly before, during, or after the ambient noise event that corresponds to the child 302 crying. The automated assistant client 120 executing on the assistant device 110 may cause the assistant device 110 to send an indication of the ambient noise 304 along with any such received spoken utterances of the user 301 based on determining that the spoken utterances of the user 301 were directed to the automated assistant, and further based on determining that the ambient noise 304 constitutes an ambient noise event (e.g., particular type of noise and/or above a threshold volume level) detected as occurring within a threshold time window around the time the user 301 spoke the utterance(s) directed to the automated assistant.

FIG. 3B depicts example interactions between the user 301 in the example environment of FIG. 3A and the automated assistant. In the example interactions of FIG. 3B, the interactions between the user 301 and the automated assistant are depicted as occurring through textual input and output via the automated assistant client 120 on the display of the assistant device 110. However, it should be appreciated that, in some implementations, the user-assistant interactions of FIG. 3B may be carried out verbally/audibly using one or more microphones and one or more speakers of the assistant device 110.

In FIG. 3B, the user 301 provides the user input 300B of "Help!" shortly after, or during, the time when the child 302 of FIG. 3A is making the ambient noise 304 by crying in the background. The automated assistant receives this indication of user input 300B as well as an indication of the ambient noise 304 via one or more components of the assistant device 110, as described herein.

The automated assistant then processes the indication of the ambient noise 304 and the indication of the user input 300B to determine a user intent, and one or more parameters of that user intent, conveyed by the user input 300B in the context of the ambient noise 304 occurring in the environment of the user 301. The automated assistant can process the indication of the ambient noise 304 using one or more ML model(s), as described herein, to determine that the ambient noise 304 is an ambient noise event that should have one or more associated ambient state classifications, and to determine these ambient states and/or their classifications. For example, the automated assistant may determine, based on processing the audio data capturing the ambient noise 304 (optionally filtered and isolated from any spoken user inputs or other types of ambient noises), that the ambient noise 304 corresponds to an ambient state with a classification of "Baby Crying". If the user input 300B is received as a spoken utterance, then the automated assistant can process the user input 300B using one or more language ML models, as described herein, to determine a transcription of the user input 300B. If the user input 300B is received in the form of textual input, then the indication of the text content of the user input 300B is used as the transcription of the user input. For example, the automated assistant may determine a transcription of the user input 300B contains the text "Help!". The automated assistant can also determine that the user input 300B of "Help!" was received shortly after, or during, the occurrence of the ambient noise 304 corresponding to the ambient state classification of "Baby Crying".

Based on these determinations, the automated assistant can then process the transcription of the user input 300B "Help!" and the ambient state classification of "Baby Crying" using one or more machine learning models configured to generate indication(s) of at least one user intent and one or more parameters associated with each user intent based on transcriptions of user inputs and classifications of ambient noise occurring shortly before, during, or shortly after the user inputs. In some implementations, these one or more machine learning models may take additional inputs used in generating these intents and parameters, such as information from a user account profile, device account profile, user-assistant interaction history, and user-device interaction history. The automated assistant can then use the indication(s) of the at least one user intent and the one or more parameters associated with each user intent to perform one or more automated assistant actions on behalf of the user. For example, the automated assistant can determine a user intent of "Calming the Baby" with parameters of "play music" and "lullaby music". As another example, the automated assistant can determine a user intent of "Play Lullaby Music" and the one or more associated parameters could indicate lullaby song titles, albums, or artists frequently played by the user or generally popular among a plurality of users (e.g., based on determining a high number of "listens" by users of a music service). As shown in FIG. 3B, based on making these determinations of the user intent and its associated parameters, the automated assistant responds to the user input 300B and the ambient noise 304 at 302B by playing music via one or more speakers of the assistant device 110 and/or of another computing device communicatively coupled to the assistant device 110 or one or more of the cloud-based automated assistant component(s) 180.

FIG. 3C depicts example interactions between the user 301 in the example environment of FIG. 3A and the automated assistant, except where the ambient noise 304 does not occur, and where different ambient noise occurs and is detected within a threshold period of time before/during/after the user provides user input directed to the automated assistant. In the example interactions of FIG. 3C, the interactions between the user 301 and the automated assistant are depicted as occurring through textual input and output via the automated assistant client 120 on the display of the assistant device 110. However, it should be appreciated that, in some implementations, the user-assistant interactions of FIG. 3C may be carried out verbally/audibly using one or more microphones and one or more speakers of the assistant device 110.

In FIG. 3C, the user 301 provides the user input 300C of "Help!" at a subsequent time when either the child 302 of FIG. 3A is not providing the ambient noise 304 or the child 302 is not present in the environment of the user 301. Rather, one or more different instances of ambient noise are detected shortly before, during, or shortly after the user provides the input 300C. For example, one or more instances of ambient noise are detected that correspond to the "Cooking Sounds" ambient state classification. The automated assistant receives the indication of user input 300C and the ambient noise audio data capturing the different ambient noise via one or more components of the assistant device 110, as described herein.

The automated assistant then processes the audio data that captures different ambient noise and the indication of the user input 300C to determine a user intent, and one or more parameters of that user intent, conveyed by the user input 300C in the context of the different ambient noise occurring in the environment of the user 301. The automated assistant can process the audio data capturing the different ambient noise (or some other indication of the different ambient noise) using one or more ML model(s), as described herein, to determine that the different ambient noise is an ambient noise event that should have one or more associated ambient state classifications, and to determine these ambient states and/or their classifications. For example, the automated assistant may determine, based on processing the audio data capturing the different ambient noise (optionally filtered and isolated from any spoken user inputs or other types of ambient noises), that the different ambient noise corresponds to an ambient state with a classification of "Cooking Sounds". If the user input 300C is received as a spoken utterance, then the automated assistant can process the user input 300C using one or more language processing ML models, as described herein, to determine a transcription of the user input 300C. If the user input 300C is received in the form of textual input, then the indication of the text content of the user input 300C is used as the transcription of the user input. For example, the automated assistant may determine a transcription of the user input 300C contains the text "Help!". The automated assistant can also determine that the user input 300C of "Help!" was received shortly after, or during, the occurrence of the different ambient noise corresponding to the ambient state classification of "Cooking Sounds".

Based on these determinations, the automated assistant can then process the transcription of the user input 300C "Help!" and the ambient state classification of "Cooking Sounds" using one or more machine learning models configured to generate indication(s) of at least one user intent and one or more parameters associated with each user intent based on transcriptions of user inputs and classifications of ambient noise occurring shortly before, during, or shortly after the user inputs. In some implementations, these one or more machine learning models may take additional inputs used in generating these intents and parameters, such as information from a user account profile, device account profile, user-assistant interaction history, user-device interaction history, and/or other audio data accessible to the automated assistant. The automated assistant can then use the indication(s) of the at least one user intent and the one or more parameters associated with each user intent to perform one or more automated assistant actions on behalf of the user. For example, the automated assistant can determine a user intent of "Cooking Assistance" with parameters of "Recipes" and "Dinner". As shown in FIG. 3C, based on making these determinations of the user intent and its associated parameters, the automated assistant responds to the user input 300C and the different ambient noise at 302C with "Hi John, it sounds like you might need some assistance making dinner. Here's a recipe for Easy Tacos I found online . . . ". The response 302C of the automated assistant further includes the text of the "Easy Tacos" recipe, as associated "Easy Tacos" preparation video, and/or a link or deeplink to the "Easy Tacos" recipe. In this example, the automated assistant may retrieve the "Easy Tacos" recipe for the user based on performing a general web search (or search of a particular website) for "Dinner Recipes", based on identifying that the user has previously viewed or accessed the "Easy Tacos" recipe, and/or based on the user's profile or account indicating that the user has an affinity for celebrating "Taco Tuesdays" and determining that today is Tuesday.

It should be appreciated that, in various implementations described herein, the user may speak the same spoken utterance (or otherwise provide the same user input to the automated assistant) at various points in time and receive different responses from the automated assistant based on differences in ambient noise detected in the environment. Differences in ambient noise detected in the environment leads to different ambient state classifications (and/or probability measures associated with such). Since different ambient state classifications are provided to the automated assistant, one or more (or all) of the user intents and/or their associated parameters may be different.

Moreover, it should be appreciated that, in some implementations, the ambient noise may continue and/or change during or after determination of or performance of the one or more automated assistant actions. In such implementations, a subsequent stream of audio data capturing the subsequent ambient noise (and/or an isolated portion of the subsequent stream generated based on filtering, transforming, etc. the audio data) is processed by the automated assistant using one or more of the ML model(s) described herein to generate one or more additional classifications for the subsequent ambient noise. The additional classifications may then be processed, optionally with the transcription of the previous user input and one or more of the classifications of the previously captured ambient noise, to generate a subsequent user intent and/or one or more additional parameters of the subsequent user intent. One or more (or all) of the subsequent user intents and/or their associated additional parameter(s) may be different from the initially predicted user intent(s) and/or parameter(s). The subsequent user intent(s) and their associated additional parameter(s) can then be used to determine and perform one or more additional automated assistant actions, as described herein. For example, the automated assistant may initially determine that ambient noise capturing metal clanging belongs to the "Cooking Sounds" classification (e.g., based on sounding similar to knife-chopping sounds) shortly before the user provides the spoken input "Help!". The automated assistant may respond by providing the user with a dinner recipe for "Easy Tacos", as described above. However, after the automated assistant provides the dinner recipe for "Easy Tacos", the ambient noise may get louder and more hectic, and the automated assistant may classify the new stream of ambient noise differently. For example, the automated assistant may determine that the new (or continuing) ambient noise corresponds to a "Refrigerator Ice Maker Malfunction" classification. The automated assistant may then determine the subsequent user intent of "Refrigerator Repair" with additional parameters indicating "Ice Maker" and "[Refrigerator Brand]". The automated assistant may then respond by performing one or more automated assistant actions, such as providing a link to a refrigerator ice maker repair video to the user's assistant device.

In some implementations, the subsequent stream of audio data capturing the ambient noise may only be used to determine one or more subsequent intents and/or their one or more additional parameters if: the subsequent ambient noise is detected within an additional threshold time period before/during/after the automated assistant performs the initial automated assistant actions determined based on the initial user input and initial instances of ambient noise, the user provides some additional user input (which may simply be a button press or selectable element selection and may or may not include additional spoken user input audio data or textual data) within an additional threshold time period before/during/after the automated assistant performs the initial automated assistant actions, and/or the presence or physical motion of the user within a threshold vicinity of the assistant device by one or more presence sensors or vision sensors of the assistant device within an additional threshold time period of the automated assistant performing the initial automated assistant actions. One or more of these additional threshold time periods may be different from the initial threshold time period for taking the initial instance(s) of ambient noise into account along with the initial spoken user input (as well as from each other). For example, the automated assistant may only process the subsequent ambient noise and/or determine the subsequent user intent(s) (and/or their associated parameter(s)) based on the subsequent ambient noise if the ambient noise is detected during the performance of at least one of the initial automated assistant actions or within a fraction of the initial time period window around when the user provides additional, subsequent spoken input following performance of the initial automated assistant actions.

In some implementations, the automated assistant may prompt the user to confirm the automated assistant actions to be performed based on the user input and the ambient noise. In such implementations, the corresponding representations can be, for example, visual representations such that corresponding selectable elements can be visually rendered via the display of the assistant device 110. These visual representations can be presented via the display at a home screen of the assistant device 110, at a lock screen of the assistant device 110, at the automated assistant client 120 application as a zero-state suggested automated assistant action or as part of transcription of a dialog between the user and the automated assistant, at a notifications interface (e.g., pop-up notification), and/or in any other manner. In these implementations, the user can select one or more of the suggested automated assistant actions for performance by the automated assistant via touch or spoken input that is responsive to the corresponding representations being visually presented. In various implementations, the automated assistant can cause an indication of the ambient state classification to be presented for presentation to this user. This informs the user as to why the one or more suggested automated assistant actions are being provided for presentation. In such implementations, if the user provides an acceptance to the suggestion or prompt, then the automated assistant actions may be executed, and one or more of the ML models described herein may be updated based on the successful determination of the user intent and the parameters by the automated assistant. If the user provides a rejection or a correction of the determined user intent and/or its associated parameter(s) (e.g., using one or more provided fields of the prompt), however, then one or more of the ML models described herein may be updated based on the incorrect determination of the user intent, one or more of its associated parameters, classification of the ambient noise, transcription of the user input, and/or automated assistant actions that are selected based on the user intent and parameter(s). In some implementations, updates to one or more of the ML models described herein may be personal to the user or the user device (e.g., updating local ML model(s) or personal versions of ML model(s) stored remotely). Thus, the one or more ML model(s) will be more tailored to the behavior and circumstances of the user. For example, one or more of the ML model(s) used for classification may be updated based on user feedback and, over time, these ML model(s) may become better able to discriminate among the types of ambient noise that occur in the user's environment and may become more accurate or specific in its classifications. In some implementations, updates to one or more of the ML models described herein may be universal or shared between similar groups of users (e.g., based on determining similarities between user profiles and assistant interaction histories). In those implementations, the one or more ML models being updated may be updated at the server and/or the updates may be pushed to the ML models stored locally on corresponding user devices. For example, one or more of the ML model(s) stored at the server and used in determining the user intent(s) and associated parameter(s) may be updated to reflect more specific or detailed user intent(s) or parameter(s) based on feedback from a plurality of users.

Figure 4:
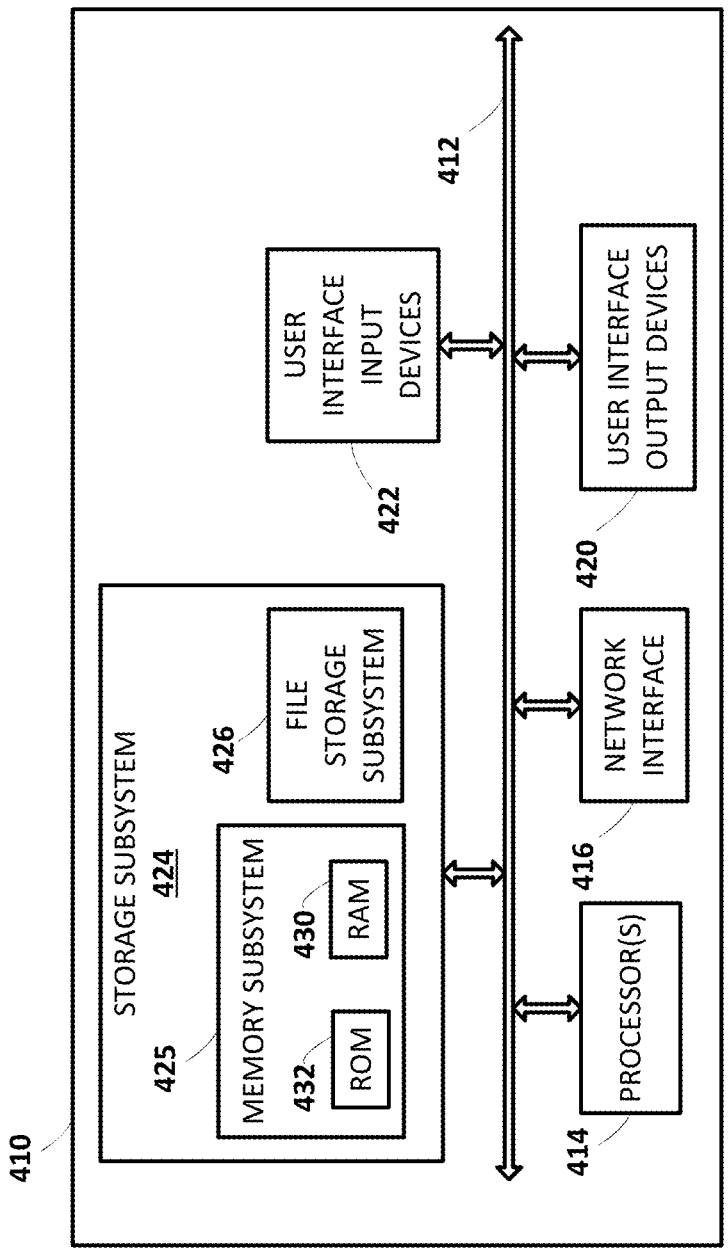
FIG. 4 depicts an example architecture of a computing device, in accordance with various implementations.

Turning now to FIG. 4, a block diagram of an example computing device 410 that may optionally be utilized to perform one or more aspects of techniques described herein is depicted. In some implementations, one or more of assistant devices, one or more of cloud-based automated assistant components, one or more assistant non-input systems, one or more assistant non-input devices, and/or other component(s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods described herein, as well as to implement various components depicted in FIG. 1.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes: determining that an instance of audio data corresponds to an ambient noise event; identifying a temporally corresponding action performed within a threshold duration of time of the ambient noise event, the temporally corresponding action being a user-initiated action performed by the user via the assistant device or an additional assistant device of the user; and in response to identifying the temporally corresponding action: generating, at the assistant device, and based on the instance of the audio data and the temporally corresponding action, a training instance to be utilized in training an ambient sensing machine learning (ML) model; and causing the ambient noise NLU ML model to be trained based on the training instance.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   detecting, via one or more microphones of an automated assistant device of a user, a stream of audio data that captures a spoken utterance of the user and that captures ambient noise occurring within a threshold time period of the spoken utterance being spoken by the user;

processing a first portion of the stream of audio data, that captures the ambient noise, to determine one or more classifications for the ambient noise;

processing a second portion of the stream of audio data, that captures the spoken utterance of the user, to generate a transcription of the spoken utterance;

processing, using a machine learning model, both the transcription of the spoken utterance and the one or more classifications of the ambient noise to generate:
a user intent, and
one or more parameters for the user intent;

performing one or more automated assistant actions based on the user intent and using the one or more parameters;

detecting, via one or more of the microphones of the automated assistant device of the user, a subsequent stream of audio data that captures the same spoken utterance of the user and that captures different ambient noise occurring within a threshold time period of the same spoken utterance being spoken by the user;

processing a subsequent stream first portion of the subsequent stream of audio data, that captures the different ambient noise, to determine one or more different classifications for the different ambient noise, the one or more different classifications for the different ambient noise being different than the one or more classifications for the ambient noise;

processing a subsequent stream second portion of the subsequent stream of audio data, that captures the same spoken utterance of the user, to generate a subsequent stream transcription of the same spoken utterance;

processing, using a machine learning model, both the subsequent stream transcription of the same spoken utterance and the one or more different classifications of the different ambient noise to generate:
a subsequent user intent that is different from the user intent, and
one or more additional parameters for the subsequent user intent; and performing one or more different automated assistant actions based on the subsequent user intent and using the one or more additional parameters, wherein the one or more different automated assistant actions are different from the one or more automated assistant actions.

2. The method of claim 1, wherein processing the first portion of the stream of audio data capturing the ambient noise to determine the one or more classifications for the ambient noise occurs before and/or while the spoken utterance of the user is being captured via one or more of the microphones.

3. The method of claim 1, wherein the one or more different classifications include a single classification that is different from the one or more classifications.

4. The method of claim 1, wherein each of the one or more different classifications are different from each of the one or more classifications.

5. The method of claim 1, wherein the one or more additional parameters are different from the one or more parameters.

6. The method of claim 1, further comprising:
during or subsequent to performing the one or more automated assistant actions based on the user intent and using the one or more parameters:

detecting, via one or more of the microphones of the automated assistant device of the user, a subsequent stream of audio data that captures subsequent ambient noise occurring within an additional threshold time period of the one or more automated assistant actions being performed;

processing a portion of the subsequent stream of audio data, that captures the subsequent ambient noise, to determine one or more additional classifications for the subsequent ambient noise;

processing, using the machine learning model, the one or more additional classifications for the subsequent ambient noise to generate:
a subsequent user intent, and
one or more additional parameters for the subsequent user intent; and causing a prompt to be provided at the automated assistant device prompting the user to authorize one or more additional automated assistant actions to be performed based on the subsequent user intent and using the one or more additional parameters.

7. The method of claim 6, further comprising:
detecting, by one or more sensors of the automated assistant device of the user, a physical motion of the user in a vicinity of the automated assistant device within the additional threshold time period of the one or more automated assistant actions being performed,
wherein processing the portion of the subsequent stream of audio data, that captures the subsequent ambient noise, is performed responsive to detecting the physical motion of the user in the vicinity of the automated assistant device within the additional threshold time period of the one or more automated assistant actions being performed.

8. The method of claim 6, wherein the subsequent stream of audio data further captures a subsequent spoken utterance of the user detected within the additional threshold time period of the one or more automated assistant actions being performed, and wherein processing the portion of the subsequent stream of audio data, that captures the subsequent ambient noise, is performed responsive to detecting the subsequent spoken utterance of the user within the additional threshold time period of the one or more automated assistant actions being performed.

9. The method of claim 8, further comprising:
processing another portion of the subsequent stream of audio data, that captures the subsequent spoken utterance of the user, to generate a subsequent transcription of the subsequent utterance,
wherein processing, using the machine learning model, the one or more additional classifications for the subsequent ambient noise to generate the subsequent user intent and the one or more additional parameters for the subsequent user intent comprises:
processing, using the machine learning model, both the subsequent transcription of the subsequent spoken utterance and the one or more additional classifications of the subsequent ambient noise to generate the subsequent user intent and the one or more additional parameters for the subsequent user intent.

10. A system comprising:
one or more microphones;
one or more processors; and
memory configured to store instructions that, when executed by the one or more processors cause the one or more processors to perform operations that include:

detecting, via the one or more microphones, a stream of audio data that captures a spoken utterance of the user and that captures ambient noise occurring within a threshold time period of the spoken utterance being spoken by the user;

processing a first portion of the stream of audio data, that captures the ambient noise, to determine one or more classifications for the ambient noise;

processing a second portion of the stream of audio data, that captures the spoken utterance of the user, to generate a transcription of the spoken utterance, processing, using a machine learning model, both the transcription of the spoken utterance and the one or more classifications of the ambient noise to generate:
a user intent, and
one or more parameters for the user intent;

performing one or more automated assistant actions based on the user intent and using the one or more parameters;

detecting, via one or more of the microphones of the automated assistant device of the user, a subsequent stream of audio data that captures the same spoken utterance of the user and that captures different ambient noise occurring within a threshold time period of the same spoken utterance being spoken by the user;

processing a subsequent stream first portion of the subsequent stream of audio data, that captures the different ambient noise, to determine one or more different classifications for the different ambient noise, the one or more different classifications for the different ambient noise being different than the one or more classifications for the ambient noise;

processing a subsequent stream second portion of the subsequent stream of audio data, that captures the same spoken utterance of the user, to generate a subsequent stream transcription of the same spoken utterance;

processing, using a machine learning model, both the subsequent stream transcription of the same spoken utterance and the one or more different classifications of the different ambient noise to generate:
a subsequent user intent that is different from the user intent, and
one or more additional parameters for the subsequent user intent; and performing one or more different automated assistant actions based on the subsequent user intent and using the one or more additional parameters, wherein the one or more different automated assistant actions are different from the one or more automated assistant actions.

11. The system of claim 10, wherein processing the first portion of the stream of audio data capturing the ambient noise to determine the one or more classifications for the ambient noise occurs before or while the spoken utterance of the user is being captured via one or more of the microphones.

12. The system of claim 10, wherein the one or more different classifications include a single classification that is different from the one or more classifications.

13. The system of claim 10, wherein each of the one or more different classifications are different from each of the one or more classifications.

14. The system of claim 10, wherein the one or more additional parameters are different from the one or more parameters.

15. The system of claim 10, further comprising instructions that, when executed by the one or more processors cause the one or more processors to perform further operations that include:
during or subsequent to performing the one or more automated assistant actions based on the user intent and using the one or more parameters:
detecting, via one or more of the microphones of the automated assistant device of the user, a subsequent stream of audio data that captures subsequent ambient noise occurring within an additional threshold time period of the one or more automated assistant actions being performed;
processing a portion of the subsequent stream of audio data, that captures the subsequent ambient noise, to determine one or more additional classifications for the subsequent ambient noise;
processing, using the machine learning model, the one or more additional classifications for the subsequent ambient noise to generate:
a subsequent user intent, and
one or more additional parameters for the subsequent user intent; and
causing a prompt to be provided at the automated assistant device prompting the user to authorize one or more additional automated assistant actions to be performed based on the subsequent user intent and using the one or more additional parameters.

16. The system of claim 15, further comprising instructions that, when executed by the one or more processors cause the one or more processors to perform further operations that include:
detecting, by one or more sensors of the automated assistant device of the user, a physical motion of the user in a vicinity of the automated assistant device within the additional threshold time period of the one or more automated assistant actions being performed,
wherein processing the portion of the subsequent stream of audio data, that captures the subsequent ambient noise, is performed responsive to detecting the physical motion of the user in the vicinity of the automated assistant device within the additional threshold time period of the one or more automated assistant actions being performed.

17. The system of claim 15, wherein the subsequent stream of audio data further captures a subsequent spoken utterance of the user detected within the additional threshold time period of the one or more automated assistant actions being performed, and wherein processing the portion of the subsequent stream of audio data, that captures the subsequent ambient noise, is performed responsive to detecting the subsequent spoken utterance of the user within the additional threshold time period of the one or more automated assistant actions being performed.

18. The system of claim 17, further comprising instructions that, when executed by the one or more processors cause the one or more processors to perform further operations that include:
processing another portion of the subsequent stream of audio data, that captures the subsequent spoken utterance of the user, to generate a subsequent transcription of the subsequent utterance,
wherein processing, using the machine learning model, the one or more additional classifications for the subsequent ambient noise to generate the subsequent user intent and the one or more additional parameters for the subsequent user intent comprises:

processing, using the machine learning model, both the subsequent transcription of the subsequent spoken utterance and the one or more additional classifications of the subsequent ambient noise to generate the subsequent user intent and the one or more additional parameters for the subsequent user intent.

19. A method implemented by one or more processors, the method comprising:
- detecting, via one or more microphones of an automated assistant device of a user, a stream of audio data that captures a spoken utterance of the user and that captures ambient noise occurring within a threshold time period of the spoken utterance being spoken by the user;
- processing a first portion of the stream of audio data, that captures the ambient noise, to determine one or more classifications for the ambient noise;
- processing a second portion of the stream of audio data, that captures the spoken utterance of the user, to generate a transcription of the spoken utterance;
- processing, using a machine learning model, both the transcription of the spoken utterance and the one or more classifications of the ambient noise to generate:
  - a user intent, and
  - one or more parameters for the user intent;
- performing one or more automated assistant actions based on the user intent and using the one or more parameters;
- detecting, via one or more different microphones of a different automated assistant device of a different user, a subsequent stream of audio data that captures the same spoken utterance being spoken by the different user and that captures different ambient noise occurring within a threshold time period of the same spoken utterance being spoken by the different user;
- processing a subsequent stream first portion of the subsequent stream of audio data, that captures the different ambient noise, to determine one or more different classifications for the different ambient noise, the one or more different classifications for the different ambient noise being different than the one or more classifications for the ambient noise;
- processing a subsequent stream second portion of the subsequent stream of audio data, that captures the same spoken utterance of the different user, to generate a subsequent stream transcription of the same spoken utterance;
- processing, using a machine learning model, both the subsequent stream transcription of the same spoken utterance and the one or more different classifications of the different ambient noise to generate:
  - a subsequent user intent that is different from the user intent, and
  - one or more additional parameters for the subsequent user intent; and
- performing one or more different automated assistant actions based on the subsequent user intent and using the one or more additional parameters, wherein the one or more different automated assistant actions are different from the one or more automated assistant actions.

* * * * *